(12) United States Patent
Fattal et al.

(10) Patent No.: US 8,659,510 B2
(45) Date of Patent: Feb. 25, 2014

(54) SPATIAL LIGHT MODULATOR

(75) Inventors: David A. Fattal, Mountain View, CA (US); Charles M. Santori, Palo Alto, CA (US); Marco Fiorentino, Mountain View, CA (US); Raymond G. Beausoleil, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 376 days.

(21) Appl. No.: 13/119,934

(22) PCT Filed: Dec. 16, 2008

(86) PCT No.: PCT/US2008/087036
§ 371 (c)(1),
(2), (4) Date: Mar. 18, 2011

(87) PCT Pub. No.: WO2010/071635
PCT Pub. Date: Jun. 24, 2010

(65) Prior Publication Data
US 2011/0169815 A1    Jul. 14, 2011

(51) Int. Cl.
*G09G 3/20* (2006.01)
(52) U.S. Cl.
USPC .................. 345/55; 257/5; 365/148; 345/212

(58) Field of Classification Search
USPC ......... 345/55, 212; 365/148; 257/5, E45.003, 257/E21.004; 977/943; 711/103
See application file for complete search history.

(56) References Cited

U.S. PATENT DOCUMENTS

| | | | | |
|---|---|---|---|---|
| 5,841,489 A | * | 11/1998 | Yoshida et al. | 349/17 |
| 5,999,306 A | | 12/1999 | Atobe et al. | |
| 6,281,866 B1 | * | 8/2001 | Robinson et al. | 345/87 |
| 6,791,735 B2 | | 9/2004 | Stappaerts | |
| 7,092,138 B2 | | 8/2006 | Wang et al. | |
| 7,292,382 B2 | * | 11/2007 | Fujimori et al. | 359/254 |
| 2004/0080484 A1 | * | 4/2004 | Heines et al. | 345/108 |
| 2005/0093793 A1 | * | 5/2005 | Richards et al. | 345/84 |
| 2006/0082526 A1 | * | 4/2006 | Anthony et al. | 345/82 |
| 2006/0274007 A1 | * | 12/2006 | Lee | 345/89 |
| 2007/0188858 A1 | * | 8/2007 | Slinger | 359/385 |
| 2008/0088651 A1 | * | 4/2008 | Maeda et al. | 345/694 |
| 2008/0090337 A1 | | 4/2008 | Williams | |
| 2008/0219039 A1 | * | 9/2008 | Kumar et al. | 365/148 |

OTHER PUBLICATIONS

Chua, Leon, "Memristor—The Missing Ciruit Element", Sep. 1971.*

* cited by examiner

*Primary Examiner* — Koosha Sharifi-Tafreshi

(57) ABSTRACT

A spatial light modulator includes an array of pixels, with each of the pixels having a dimension smaller than a wavelength of light to be modulated. Each of the pixels further has a permittivity that can be controlled using an electronic signal applied to the pixel.

22 Claims, 3 Drawing Sheets

SPATIAL LIGHT MODULATOR

BACKGROUND

The memristor was originally proposed as a passive circuit element that provides a relationship between charge, current, voltage, and/or magnetic flux that complements the relationships provided by the resistor, the capacitor, and the inductor. In particular, a memristor is a two-terminal circuit element that has a memristance $M(q)$ that depends on the net charge $q$ that has passed through the memristor, and the voltage $V$ across a memristor is equal to the product of the memristance $M(q)$ and the current $I$ through the memristor, i.e., $V=M(q)I$. Fabrication of memristors and other memristive devices has been impractical until recently. Some of the first practical memristive devices are described in U.S. Pat. App. Pub. No. 2008/0090337, entitled "Electrically Actuated Switch," to R. Stanley Williams. These memristive devices utilize the behavior of nanoscale materials, particularly, a thin film of a material such as titanium dioxide between two electrodes. The memristive elements can currently be fabricated with feature sizes on the order of about 10 nm.

In another technology, a spatial electro-optical amplitude modulator can control the spatial distribution of the intensity and/or the phase of light over an area and thereby form an image or a pattern of illumination represented by electronic control signals. A backlit liquid crystal display (LCD), for example, contain pixels that are arranged in an array, and an image can be formed across the area of the array by applying electrical signals respectively to the pixels to control the light intensities transmitted through the pixels in the LCD. LCDs are well suited for displays viewed by the human eye. However, other uses of images or illumination patterns such as in photolithographic processes often require pixels sizes that are too small to be directly created using current LCD technology. Further, LCD devices are currently unable to modulate light with short wavelengths, such as ultraviolet (UV) light, and short wavelength light is needed or desirable for illumination involving feature sizes smaller than about 1 µm. LCD pixels also have response times on the order of a millisecond, which may be too slow for many uses.

BRIEF DESCRIPTION OF THE DRAWINGS

Use of the same reference symbols in different figures indicates similar or identical items.

DETAILED DESCRIPTION

In accordance with an aspect of the invention, a spatial light modulator includes an array of pixels containing memristive devices or other circuit elements with a characteristic such as conductivity that is programmable to change the permittivity of the modulator. Each pixel can be made smaller than the wavelength of the light modulated, so that changing the permittivity of the pixels can create a pattern of variations that diffracts light. When the surface of the modulator is illuminated, diffraction can produce a first or higher order diffraction maximum that is spatially modulated. Alternatively, diffraction can remove a portion of the light so that the light that is reflected from or transmitted through the modulator is spatially modulated. Accordingly, the small pixel size and electronic control of permittivity allows the array of pixels to act as a reconfigurable diffraction grating that modulates incident light.

Figure 1:
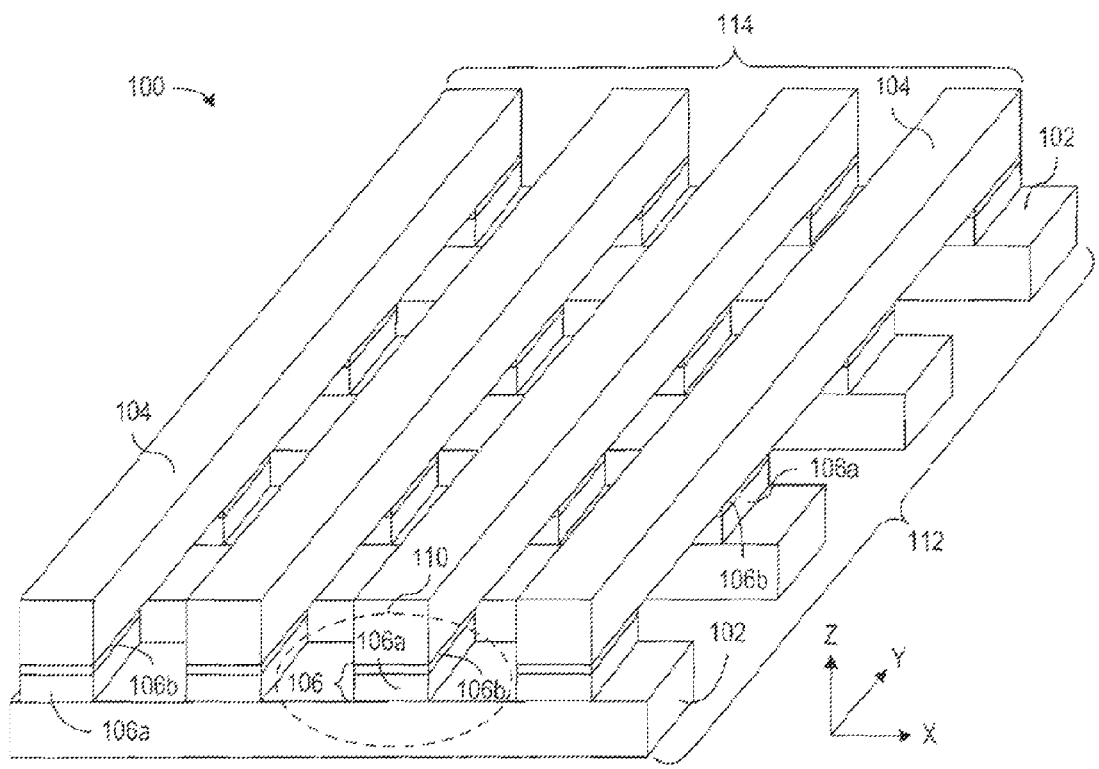
FIG. 1 shows a spatial light modulator in accordance with an embodiment of the invention that employs programmable conductivity in a vertical direction.

FIG. 1 illustrates a portion of a spatial electro-optical amplitude modulator 100 in accordance with an embodiment of the invention. Modulator 100 includes bottom wires 102, top wires 104, and memristive junctions 106. Bottom wires 102 are on a substrate (not shown) and run substantially parallel to an X axis in FIG. 1. Top wires 104 cross bottom wires 102 (e.g., run substantially parallel to the Y axis) and are at or near an optical surface where light would be incident on modulator 100 during operation. Memristive junctions 106 are the active portions of memristive devices 110 that are at respective locations where wires 102 and 104 cross. Memristive devices 110 in the illustrated embodiment are two-terminal circuit elements and may be memristors or switches. Memristive devices 110 form an array that is spread across an illumination area of modulator 100. FIG. 1 shows only a small portion of the array, and an actual modulator might contain up to $10^4$ memristive cells per micron$^2$ in the illumination area. Control, address, and driver circuits (not shown) can also be included in an integrated structure with modulator 100 for operation of memristive devices 110 as described further below.

Each memristive device 110 includes a corresponding junction 106 between a corresponding bottom wire 102 and a corresponding top wire 104. Wires 102 and 104 are conductive and may be metal or semiconductor. In many cases, both sets of wires 102 and 104 are metal, specifically, platinum. FIG. 1 illustrates an embodiment of modulator 100 in which bottom wires 102 are parallel to each other and wires 104 are parallel to each other and perpendicular to wires 102. Alternatively, the angle between wires 102 and 104 may vary. Wires 102 and 104 form a lattice or crossbar with each wire 104 overlying all of the bottom wires 102 and coming into close contact with each top wire 102 at intersections where memristive devices 110 reside. Such crossbar structures may be fabricated from micron-, submicron- or nanoscale-wires, depending on the use of modulator 100, e.g., depending on the wavelength of the light modulated. Although individual wires 102 and 104 are shown with square or rectangular cross-sections that can be formed by patterning layers, wires 102 and 104 can alternatively have circular, elliptical, or more complex cross-sections and can be formed in manners other than patterning of layers. Wires 102 and 104 may also have many different widths or diameters and aspect ratios or eccentricities depending on the desired features of modulator 100 and memristive devices 110, particularly depending on the desired pitch and sizes of memristive devices 110 in modulator 100.

The spacing of wires 102 and 104 and area of memristive devices 110 will generally be small compared to the wavelength of light to be modulated. For example, the pitch for the array of memristive devices 110 fabricated using techniques such as described below can be on the order of tens of nanometers and therefore shorter than the wavelengths corresponding to even far ultraviolet light, i.e., wavelengths as short as about 100 nm. Ultraviolet light or longer wavelength light incident on the top of modulator 100 will thus interact with multiple wires 102, multiple wires 104, and multiple memristive devices 110. As a result of the distributed nature of the light-matter interaction, modulator 100 will appear to have a high conductivity along the direction of wires 102 (i.e., parallel to the X axis) and a high conductivity along the direction of wires 104 (i.e., parallel to the Y axis), but the effective conductivity of modulator 100 perpendicular to the surface of modulator 100 (i.e., parallel to the Z axis) will depend on the thicknesses and the conductivities of memristive devices 110.

The conductivity at any memristive device 110 is inversely related to the memristance of the device 110 and is programmable because the memristance depends on the net charge that has passed through the memristive device 110. Each junction 106 in a memristive device 110 provides the desired memristive properties of the corresponding memristive device 110. In an exemplary embodiment, each junction 106 includes a layer 106a of primary active material such as $TiO_2$ and a layer 106b of secondary source/sink material such as $TiO_{2-x}$, where the value x can be up to about 0.04 to provide a significant concentration of oxygen vacancies. Each memristive device 110 can act as a switch when the material in layer 106a has a high resistance state (e.g., is an insulator when no dopants are present in layer 106a) and a low resistance state (e.g., is a semiconductor when a relatively small concentration of dopants is present in layer 106a). The materials of layers 106a and 106b are also ionic conductors so that a bias voltage can drive a current of dopant ions (e.g., oxygen vacancies) between layers 106a and 106b, but the ion drift is preferably weak so that no significant ion current flows when no bias voltage is applied. The net total of charged ions moved between layers 106a and 106b determines the resistance or memristance M(q) of layer 106a. In the exemplary embodiment where layer 106a is initially $TiO_2$ and layer 106b is $TiO_{2-x}$, each memristive device 110 has a high resistance (or OFF) state where layer 106a is an insulator ($TiO_2$), but an ion current causes oxygen vacancies from $TiO_{2-x}$ in layer 106b to move into layer 106a, transforming layer 106a into a low resistance (or ON) state in which layer 106a is a semiconductor $TiO_{2-x}$. More generally, the conductivity of a memristive device 110 varies continuously with the net charge passed through the memristive device 110, so that the conductivity of a memristive device 110 is not limited to binary OFF and ON states.

Memristive devices 110 can be formed using materials that are electronically a semiconductor or an insulator depending on doping and that are also weak ionic conductors to enable dopant species to be injected into and out of the active region 106a when appropriate voltages are applied. The injection process is relatively fast. In particular, the OFF-ON switching time for some memristive switches to switch from the OFF state to the ON state is on the order of nanoseconds, and the ON-OFF switching time to switch from the ON state to the OFF state is on the order of microseconds. In general, excellent switching materials are the compound semiconducting oxides and nitrides, but semiconducting sulfides, phosphides, chlorides, selenides, arsenides, and bromides can also provide switching. More generally, any semiconducting material that is also a weak ionic conductor with respect to species that can electrically dope the semiconductor will work. In other words, possible switch compounds are semiconducting compounds with significant ionic contribution to the bonding. A good combination is a primary active layer 106a that is undoped and stoichiometric, and thus a good insulator, combined with a secondary source/sink layer 106b of the same or related parent material that either contains anion vacancies or other dopant species that can drift into layer 106a under the application of an applied bias voltage. Source/sink layer 106b is preferably very conductive and such that the change in doping concentration has a relatively small effect on the conductivity of material 106b. But, since the primary material 106a is essentially intrinsic, even a small amount of dopant will have a very dramatic effect on the conductivity of material 106a. Table 1 lists some examples of materials suitable for two-layer memristors or other memristive devices.

TABLE 1

Examples of Materials and Dopant Species for Memristive elements

| Primary Material | Secondary Material | Dopant Species |
| --- | --- | --- |
| $TiO_2$ | $TiO_{2-x}$ | Oxygen Vacancies |
| $ZrO_2$ | $ZrO_{2-x}$ | Oxygen Vacancies |
| $HfO_2$ | $HfO_{2-x}$ | Oxygen Vacancies |
| $SrTiO_3$ | $SrTiO_{2-x}$ | Oxygen Vacancies |
| GaN | $GaN_{1-x}$ | Nitrogen Vacancies |
| CuCl | $CuCl_{1-x}$ | Chlorine Vacancies |
| GaN | GaN: S | Sulfide Ions |

U.S. Pat. App. Pub. No. 2008/0090337 describes further alternatives for materials and structures suitable for memristive devices 110. In general, a spatial light modulator can employ an array of pixels where each pixel contains one or more devices having a programmable conductivity. The programmable conductivity can be provided by many different types of devices. Thus, the memristive devices 110 are not limited to being two-layer memristors or memristive switches but can employ a variety of devices that provide programmable conductivity between wires 102 and 104. Further, memristive devices are described here because they have programmable conductivity and can be fabricated with feature sizes that are small relative to the wavelengths of the light to be modulated. Other types of devices such as transistors, which have conductivities that can be electrically changed, or devices with programmable permittivity or magnetic permeability may be similarly used in alternative embodiments of the invention.

Memristive elements and modulators disclosed herein may be fabricated using a wide range of processing techniques. For fabrication of modulator 100, bottom wires 102 (whether metal or semiconductor) can be fabricated using conventional techniques such as deposition of a suitable material (e.g., a metal such as platinum or a conductive semiconductor such as ITO) and patterning the layer using photolithography, electron beam lithography, or more advanced techniques, such as imprint lithography. Gaps between bottom wires 102 can be filled with an insulating material, and the entire structure can be planarized if desired. Alternatively, a layer deposited for formation wires 102 may be patterned after layers for some overlying structures such as layers 106a and 106b are deposited.

A layer (not shown) of non-covalent interface material can be deposited on bottom wires 102 to reduce diffusion between bottom wires 102 and overlying structures but the non-covalent interface may be omitted if greater mechanical strength is required, at the expense of slower switching at higher applied voltages. The non-covalent layer could be a molecular monolayer formed by a Langmuir-Blodgett (LB) process or could be a Self-Assembled Monolayer (SAM). In general, this molecular layer may form only weak van der Waals-type bonds to bottom wires 102 and to active layer 106a. Alternatively, the non-covalent layer may be a thin layer of ice deposited onto a cooled substrate. The material to form the ice may be an inert gas such as argon (Ar) or it could be a molecular species such as carbon dioxide ($CO_2$). In this case, the ice is a sacrificial layer that prevents strong chemical bonding between the bottom wires 102 and active layer 106a, and is lost from the system by heating the sample later in the processing sequence to sublime the ice away. One skilled in this art can easily conceive of other ways to form weakly bonded interfaces between bottom wires 102 and active layer 106a.

A material such as described above for the primary active layer 106a is deposited on bottom wires 102 or the bottom wire layer with or without an intervening non-covalent layer. This deposition can be done by a wide variety of conventional physical and chemical techniques, including evaporation from a Knudsen cell, electron beam evaporation from a crucible, sputtering from a target, or various forms of chemical vapor or beam growth from reactive precursors. The thickness of layer 106a may be in the range from 1 to 30 nm, and layer 106a may be grown to be free of dopants. In this case, the as-grown structure will be in the OFF state. Depending on the thickness of layer 106a, layer 106a may be nanocrystalline, nanoporous or amorphous in order to increase the speed with which ions can drift in the material to achieve doping by ion injection or undoping by ion ejection from layer 106a. Appropriate growth conditions, such as deposition speed and substrate temperature, may be chosen to achieve the chemical composition and local atomic structure desired for this initially insulating or low conductivity layer 106a.

The next layer 106b is the dopant source layer or secondary active layer for the primary switching layer 106a. Layer 106b may also be deposited by any of the techniques mentioned above. The material of layer 106b is chosen to provide the appropriate doping species for the primary active material of layer 106a. This secondary material 106b is chosen to be chemically compatible with the primary material 106a, e.g., the two materials of layers 106a and 106b should not react chemically and irreversibly with each other to form a third material. As mentioned above, one example of a pair of materials that can be used as layers 106a and 106b are $TiO_2$, and $TiO_{2-x}$, respectively. Titanium dioxide is a semiconductor with an approximately 3.2 eV bandgap and is also a weak ionic conductor. A thin film of $TiO_2$ will create the tunnel barrier to create the OFF state of a memristive switch, and the $TiO_{2-x}$ forms a source of oxygen vacancies to dope the $TiO_2$ and make layer 106a conductive.

Partial patterning of layers 106a and 106b and formation of bottom wires 102 can be performed after formation of layers 106a and 106b. In particular, trenches running parallel to the X axis in FIG. 1 can be formed through layer 106b, layer 106a, and the layer corresponding to bottom wires 102. After this patterning, the trenches can be filled with an insulating material and the entire structure may be planarized.

A second metal or semiconductor layer for top wires 104 is fabricated on top of the secondary active layer 106b, in a manner similar to which the layer for bottom wires 102 was created. An etching process can then form trenches in the Y direction to remove stripes of deposited conductive material and portions of layers 106b and 106a that are not under the top wires 104 in order to isolate memristive devices 110. If desired, a planarization process can be performed after forming top wires 104 to provide modulator 100 with a flat top surface that will receive incident light.

An issue with respect to fabricating switch devices is to carefully control the dopant concentration in the material of memristive junction 106, whether that dopant is the presence of a different type of atom or the absence of a particular atom (e.g., a vacancy) from the lattice. The dopant species may be introduced into the growth medium or the amount of one component may be decreased in order to induce vacancies. One approach is to grow a high quality and pure layer 106 of the host material, and then to deposit a carefully determined amount of a species directly on top of the host material to create distinct upper and lower layers 106b and 106a. The species used may be a dopant species that will then diffuse to a specific depth in the host layer 106, or the species may be a reactive material that will react chemically with one of the components of the host layer to induce vacancies in an upper portion of the host layer. An example of such an approach is to deposit a small amount of aluminum on top of a high quality and pure layer of titanium dioxide. The aluminum reacts partially with the oxygen of the titanium dioxide to form some alumina and leave vacancies in the titanium dioxide. This is a process similar to "delta doping" currently practiced in the semiconductor industry to provide a very thin layer of very highly doped semiconductor material.

Figure 2:
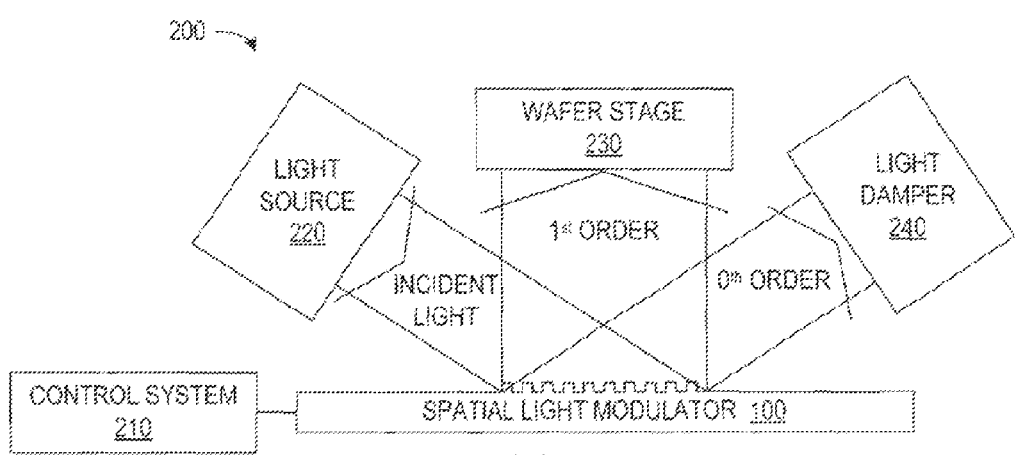
FIG. 2 is a block diagram of a system employing a spatial light modulator in accordance with an embodiment of the invention.

FIG. 2 illustrates a system 200 for using a spatial light modulator 100 to create an image or a spatially modulated pattern of illumination. In system 200, spatial light modulator 100 is of the type shown in FIG. 1 and is connected to a control system 210 that applies electronic signals for programming of modulator 100. In particular, each memristive device 110 in modulator 100 can have its memristance, which is inversely related to its conductivity, changed by ionic current flowing in the memristive device 110. Control system 210 can include data that indicates the states or memristances desired for respective memristive devices 110. Drivers and address decoding circuits, which may be in spatial modulator 100 or control system 210, connect to wires 102 and 104 in modulator 100 and can apply a voltage difference between two wires 102 and 104 that cross at the memristive device 110 to be set. The voltage difference causes a current of ion dopants between layers 106a and 106b in the target memristive device 110 and thereby changes the conductivity of layer 106a in that memristive device 110. In general, a single memristive device 110 or a partial or full row or column of memristive devices 110 can be programmed simultaneously. Memristive devices 110 are non-volatile and retain their conductivity states after the electronic programming signals are shut off. The effective conductivity of modulator 100 in the Z direction can thus be varied. For example, when memristive devices 110 are used as switches, switching a memristive device 110 between the ON state and the OFF state can drastically change the $\in_{zz}$ component of the dielectric tensor in a small area of modulator 100. Appropriate programming of memristive devices 110 can create a pattern of the variation in conductivity (and therefore in the refractive index) of the structure with sufficient resolution to act as a diffraction grating for light having short UV wavelengths.

A light source 220 in system 200 can illuminate the optical surface of modulator 100. Light source 220 can be a general source of electromagnetic radiation but may particularly be a coherent source of monochromatic electromagnetic radiation with any desired wavelength, including but not limited to microwaves, infrared light, visible light, and ultraviolet light. For modulator 100 of FIG. 1, which has programmable conductivity in the vertical direction, the incident light needs to have an electric field with a non-zero vertical component, e.g., light with p polarization is incident at some angle to the surface of modulator 100. The incident light will then diffract according to the pattern conductively and refractive index variation resulting from the programming of spatial modulator 100.

In the illustrated configuration, a wafer stage 230 is at an angle relative to the incident light corresponding to a first order diffraction maximum. Accordingly, an image or illumination pattern formed on a wafer held in wafer stage 230 will have bright wafer areas where the conductivity variation in a corresponding area of modulator 100 diffract light at the angle corresponding to wafer stage 230 and have dark areas where the conductivity variation in a corresponding area of modulator 100 diffract no light of diffract light at an angle that differs from the angle corresponding to wafer stage 230. Wafer stage 230 is shown as a target of the modulated light to illustrate one specific use of spatial light modulator 100, but modulator 100 can alternatively be used to project an image or an illumination pattern on any desired target.

The first order maximum is used for the modulated light in FIG. 2, but other orders of the diffraction pattern (i.e., other angles for the position of wafer stage 230 or another target) could be used. Zeroth order light, which corresponds to specular reflection of the incident light beam from modulator 100, is discarded by being absorbed by a damper 240 in system 200, but the zeroth order light will contain modulation corresponding to the light that diffraction removes from the incident beam. The same principles used to modulate reflected light in system 200 of FIG. 2 could be employed in a spatial modulator that is able to transmit light and modulate the transmitted light.

Figure 3:
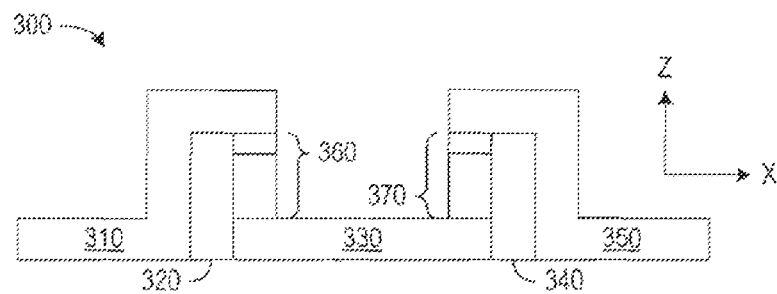
FIG. 3 shows a cross-sectional view of a memristive device that provides programmable conductivity along a horizontal direction for a spatial light modulator in accordance with an embodiment of the invention.

FIG. 3 shows a cross-section of a memristive device 300 that provides programmable conductivity in a direction along the surface of a modulator, e.g., in the X direction. Memristive device 300 includes conductive regions 310, 330, and 350 that are electrically isolated from each other by insulating regions 320 and 340. In the illustrated embodiment, a portion of conductive region 310 extends up and over insulating region 320 and makes contact with a memristive junction 360 that is between conductive regions 310 and 330. Similarly, a portion of conductive region 350 extends up and over insulating region 340 and makes contact with a memristive junction 370 that is between conductive regions 330 and 350. Memristive junctions 360 and 370 can have any of the constructions described above, but in an exemplary embodiment, each junction 360 or 370 includes an intrinsic titanium dioxide ($TiO_2$) layer in contact with an overlying titanium dioxide layer with oxygen vacancies ($TiO_{2-x}$).

An appropriate bias voltage applied between layers 310 and 330 can cause an ion current in memristive junction 360, which idler a required OFF-ON switching time, will switch junction 360 from an OFF state to an ON state (i.e., switch junction 360 between being an insulator and being a semiconductor). Reversing the direction of ion current for the required ON-OFF switching time can switch memristive junction 360 back from the ON state to the OFF state. Similarly, an appropriate bias voltage applied between layers 350 and 330 for the OFF-ON switching time can cause an ion current in memristive junction 370 and switch junction 370 from an OFF state to an ON state, and reversing the bias voltage for the ON-OFF switching time switches junction 370 back to the OFF state. When both junctions 360 and 370 are in the OFF state (i.e., nonconductive) regions 310, 330, and 350 are electrically isolated, and as long as the dimensions of regions 310, 330, and 350 are significantly less than the wavelength of incident light, the effective conductivity of device 300 in the X direction will be small for the incident light. However, if both junctions 360 and 370 are in the ON state (i.e., conductive), device 300 will have a conductive path in the X direction that extends through all three regions 310, 320, and 330. The longer conductive path increases the apparent conductivity of device 300 in the X direction for incident light.

Figure 4:
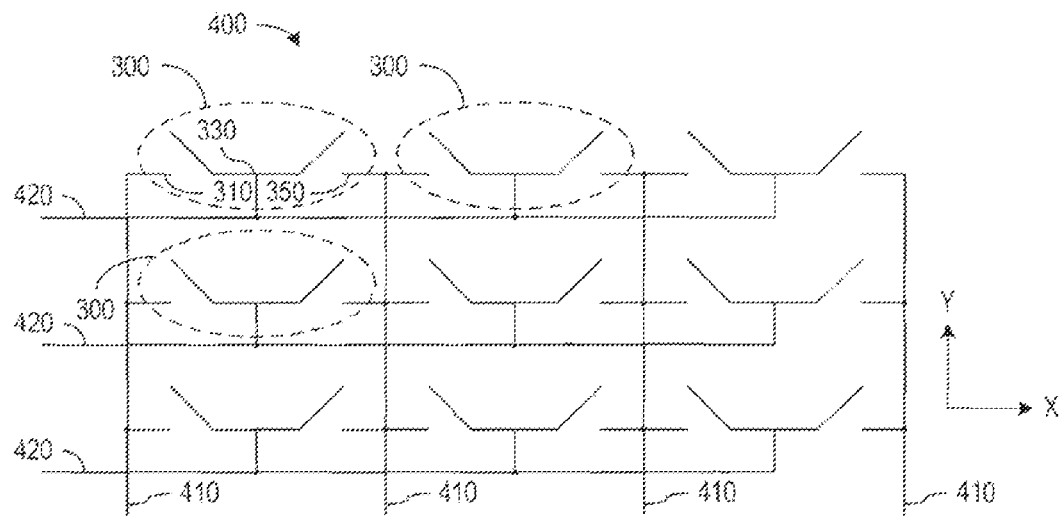
FIG. 4 shows a portion of a spatial light modulator in accordance with an embodiment of the invention employing the memristive devices of FIG. 3.

Memristive devices 300 can be used in a modulator 400 containing rows and columns of devices 300 as shown in FIG. 4, and modulator 400 could be used in system 200 of FIG. 2 in place of modulator 100. Modulator 400 includes column lines 410 with each column line 410 being electrically connected to conductive regions 310 or 350 of devices 300 in a corresponding column and row lines 420 with each row line 420 being electrically connected to conductive regions 330 in the devices 300 in a corresponding row. Row lines 420 can be buried in a substrate underlying devices 300, so that the continuous row lines 420 do not significantly interact with light incident on modulator 400.

Each memristive junction 360 or 370 can be programmed to a desired state, e.g., an OFF state or an ON state, by applying an appropriate voltage difference between the column and row lines 410 and 420 that intersect at the junction 360 or 370. By programming junctions 360 and 370 to respective target states, modulator 400 can be programmed to have conductivity in the X direction with variations so that variations in the $\in_{xx}$ component of the dielectric tensor in modulator 400 cause diffraction of an incident beam. However, each device 300 may be small relative to the wavelength of the incident light, and modulator 400 may contain a large number of junctions 360 and 370 that need to be programmed. To reduce the number of programming operations required, multiple devices 300 can be combined into a single pixel. This reduces resolution of the pattern but permits simultaneous programming of larger numbers of devices.

Figure 5:
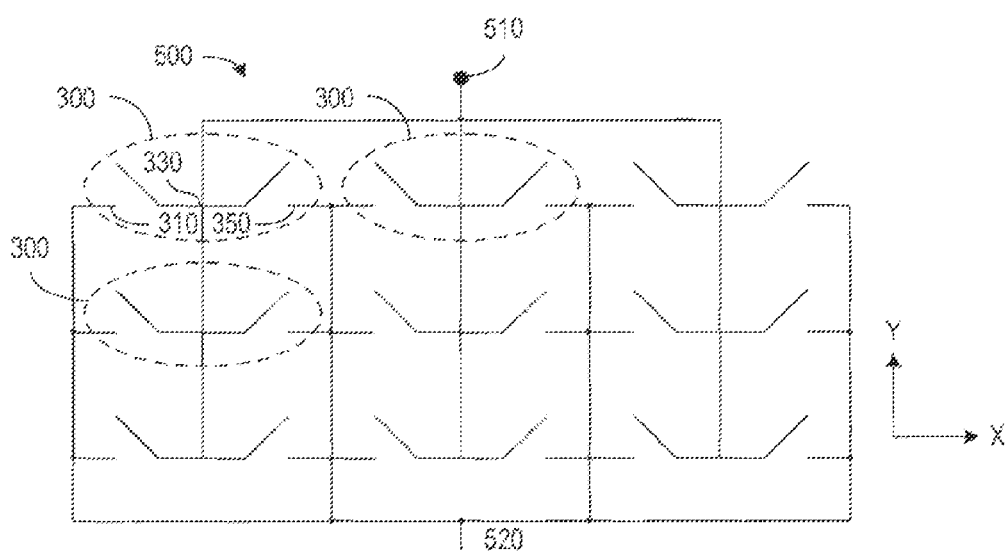
FIG. 5 shows a circuit diagram of a pixel for a spatial light modulator in accordance with an embodiment of the invention employing memristive devices of the type illustrated in FIG. 3.

FIG. 5 shows a pixel 500 containing multiple memristive devices 300 of the type illustrated in FIG. 3. In particular, pixel 500 contains multiple rows and columns of devices 300. Devices 300 in a row are connected in series with conductive regions 350 of at least one device 300 connected to conductive region 310 of the next device 300 in the row. Devices 300 in a column are connected in parallel with regions 310 connected together, regions 330 connected together, and regions 350 connected together. A terminal 510 of pixel 500 is connected to conductive regions 330 of all devices 300 in pixel 300, and a terminal 520 of pixel 500 is connected to conductive regions 310 and 350 of all devices 300 in pixel 500. Accordingly, applying an appropriate voltage difference between terminals 510 and 520 can simultaneously program the junctions 360 and 370 in all devices 300 in pixel 500 to the conductive ON state or simultaneously program the junctions 360 and 370 in all devices 300 in pixel 500 to the nonconductive OFF state.

Pixel 500 has effective conductivities to incident light that are nearly constant in Y and Z directions. However, the effective conductivity of pixel 500 in the X direction depends on the conductivity states of junctions 360 and 370 in pixel 500. When all junctions 360 and 370 are nonconductive, conductive regions 310, 330, and 350 are isolated from each other in devices 300, and pixel 500 will have a low effective conductivity for light having wavelengths significantly longer than the dimensions of regions 310, 330, and 350. When all junctions 360 and 370 are conductive, conductive regions 310, 330, and 350 are electrically connected in devices 300, and the rows of devices 300 connected in series can provide conductivity across a much longer distance in the X direction, making pixel 500 having an effective conductivity in the X direction that is much higher for incident light. (In this configuration, using incident light with a non-zero X component of the electric field, which happens for S polarization, will improve diffraction.) The number of devices 330 and the overall size of pixel 500 can be selected according to the wavelength of the incident light. In general, good control over the phase front of the light can be achieved with a pixel size significantly smaller than the wavelength λ of the incident light, and pixels with dimensions of about λ/5 or λ/10 will generally provide good control of a diffraction pattern.

Figure 6:
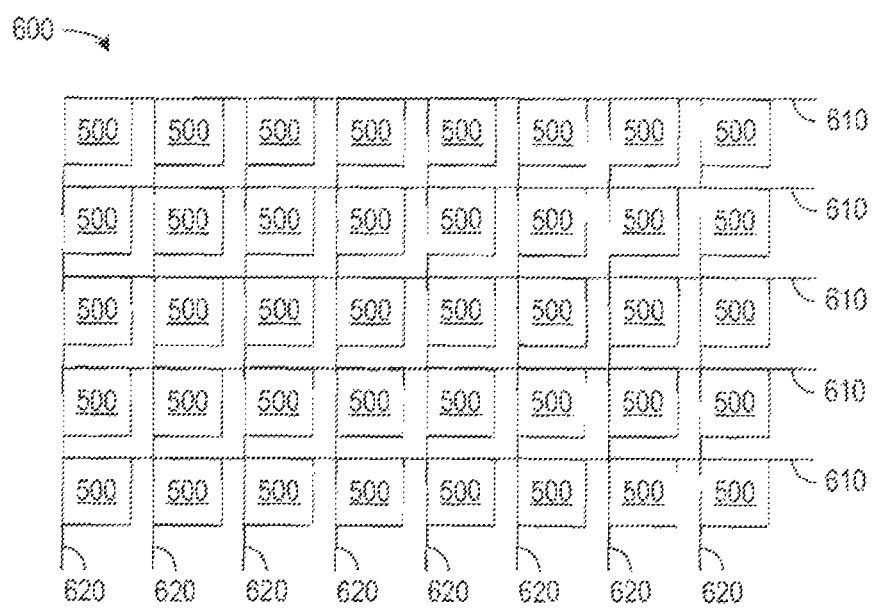
FIG. 6 illustrates the active optical area of a spatial light modulator in accordance with an embodiment of the invention employing pixels that contain multiple memristive devices.

An advantage of having multiple memristive devices in a pixel 500 is that fewer pixels 500 are required to cover a desired area of a modulator. FIG. 6 illustrates a layout of a spatial modulator 600 containing an array of multi-device pixels 600. Modulator 600 has row lines 610 with each row line 610 being coupled to one terminal 510 or 520 of each pixel in a corresponding row and column lines 520 with each column line 520 being connected to the other terminal 420 or 410 of each pixel 500 in a corresponding column. (The row or column lines 510 and 520 can be buried in a substrate underlying pixels 500 to minimize their effect on conductivity of modulator 500.) Modulator 600 can be used in place of modulator 100 in system 200 of FIG. 2 and programmed to provide a desired variation in conductivity to diffract an incident beam and produce a spatially modulated light beam.

Exemplary embodiments of the invention described above typically employ memristive devices and use variations in conductivity to cause diffraction. However, devices having other programmable or electrically changeable characteristics that effect the reflection or transmission of light could alternatively be employed. For example, in the structure of FIG. 1, with suitable selection of the materials in layers 106a and 106b, electrical signals may be able induce an ion current between layers 106a and 106b that changes the imaginary part of the optical-frequency permittivity of layer 106, without significantly altering the DC conductivity. Accordingly, the device is not required to be strictly memristive. More generally, devices capable of changing in the real part or the imaginary part of the dielectric tensor or the magnetic permeability in a pixel area could be used to cause diffraction and spatial modulation of incident light.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A modulator to spatially modulate light having a wavelength longer than a first wavelength, the modulator comprising:
   an array of pixels positioned to receive the light to be modulated, wherein:
   a pitch of the pixels in the array is shorter than the first wavelength;
   each of the pixels has a permittivity that can be controlled using an electronic signal applied to the pixel; and
   a pattern of the permittivities of the pixels across the array causes diffraction that modulates the light.

2. The modulator of claim 1, wherein each of the pixels has a conductivity that the electronic signal applied to the pixel alters to change the permittivity of the pixel.

3. The modulator of claim 1, wherein each of the pixels comprises a memristive circuit element with which the light to be modulated interacts.

4. The modulator of claim 1, wherein each of the pixels comprises a plurality of memristive circuit elements with which the light to be modulated interacts.

5. The modulator of claim 1, wherein each of the pixels comprises a switch with which the light to be modulated interacts, and the electric signal applied to the pixel can change the permittivity of the pixel by switching the switch between an ON state and an OFF state.

6. The modulator of claim 1, wherein for each of the pixels, the electronic signal applied to the pixel controls the permittivity in a direction perpendicular to a surface of the modulator on which light to be modulated is incident.

7. The modulator of claim 1, wherein for each of the pixels, the electronic signal applied to the pixel controls the permittivity in a direction parallel to a surface of the modulator on which the light to be modulated is incident.

8. A spatial light modulator comprising an array of pixels, wherein the array of pixels comprises:
   a plurality of bottom wires;
   a plurality of top wires that cross over the bottom wires; and
   a plurality of memristive junctions between the bottom wires and the top wires at locations where the top wires cross the bottom wires, and wherein:
   the modulator modulates light having a wavelength longer than a first wavelength;
   a pitch of the pixels in the array is smaller than the first wavelength; and
   each of the pixels has a permittivity that can be controlled using an electronic signal applied to the pixel.

9. A spatial light modulator comprising an array of pixels, wherein each pixel comprises a memristive device that comprises:
   a first conductive region;
   a second conductive region laterally offset from the first conductive region;
   an insulating region between the first conductive region and the second conductive region;
   a memristive junction on the second conductive region; and
   a conductive strap extending from the first conductive region to the memristive junction.

10. The modulator of claim 9, wherein each pixel comprises a plurality of the memristive devices.

11. A method for spatially modulating light comprising:
    programming permittivities of pixels in an array to create a pattern of permittivity variations across the array; and
    illuminating the array with incident light having a first wavelength, wherein the first wavelength is longer than a pitch of the pixels in the array, wherein diffraction of the incident light from the pattern of permittivity variations produces spatially modulated light.

12. The method of claim 11, wherein programming the permittivities comprises applying respective electronic signals to memristive elements respectively in the pixels.

13. The method of claim 11, further comprising using a maximum of diffracted light from the pattern as the spatially modulated light.

14. The method of claim 11, wherein diffraction removes portions of the incident light to produce the spatially modulated light.

15. The method of claim 14, wherein the spatially modulated light is reflected from the array.

16. The method of claim 11, wherein the first wavelength is greater than 100 nm, and the pitch of the pixels in the array is shorter than 100 nm.

17. The method of claim 11, wherein each of the pixels has a size less than about one fifth of the first wavelength.

18. The method of claim 11, wherein the array of pixels comprises:
a plurality of bottom wires;
a plurality of top wires that cross over the bottom wires; and
a plurality of memristive junctions between the bottom wires and the top wires at locations where the top wires cross the bottom wires.

19. The modulator of claim 1, wherein the first wavelength is greater than 100 nm, and the pitch of the pixels in the array is shorter than 100 nm.

20. The modulator of claim 1, wherein each of the pixels has a size less than about one fifth of the first wavelength.

21. The modulator of claim 8, wherein each of the pixels comprises at least one of the memristive junctions, and the permittivity of each of the pixels depends on conductivity of the at least one memristive junctions in the pixel.

22. The modulator of claim 9, wherein:
the modulator modulates light having a wavelength longer than a first wavelength;
a pitch of the pixels in the array is shorter than the first wavelength; and
each of the pixels has a permittivity that can be controlled using an electronic signal applied to the pixel.

* * * * *